Feb. 6, 1968   H. F. SMITH ET AL   3,367,187
FAILSAFE BOURDON TUBE PRESSURE GAGE
Filed March 17, 1966
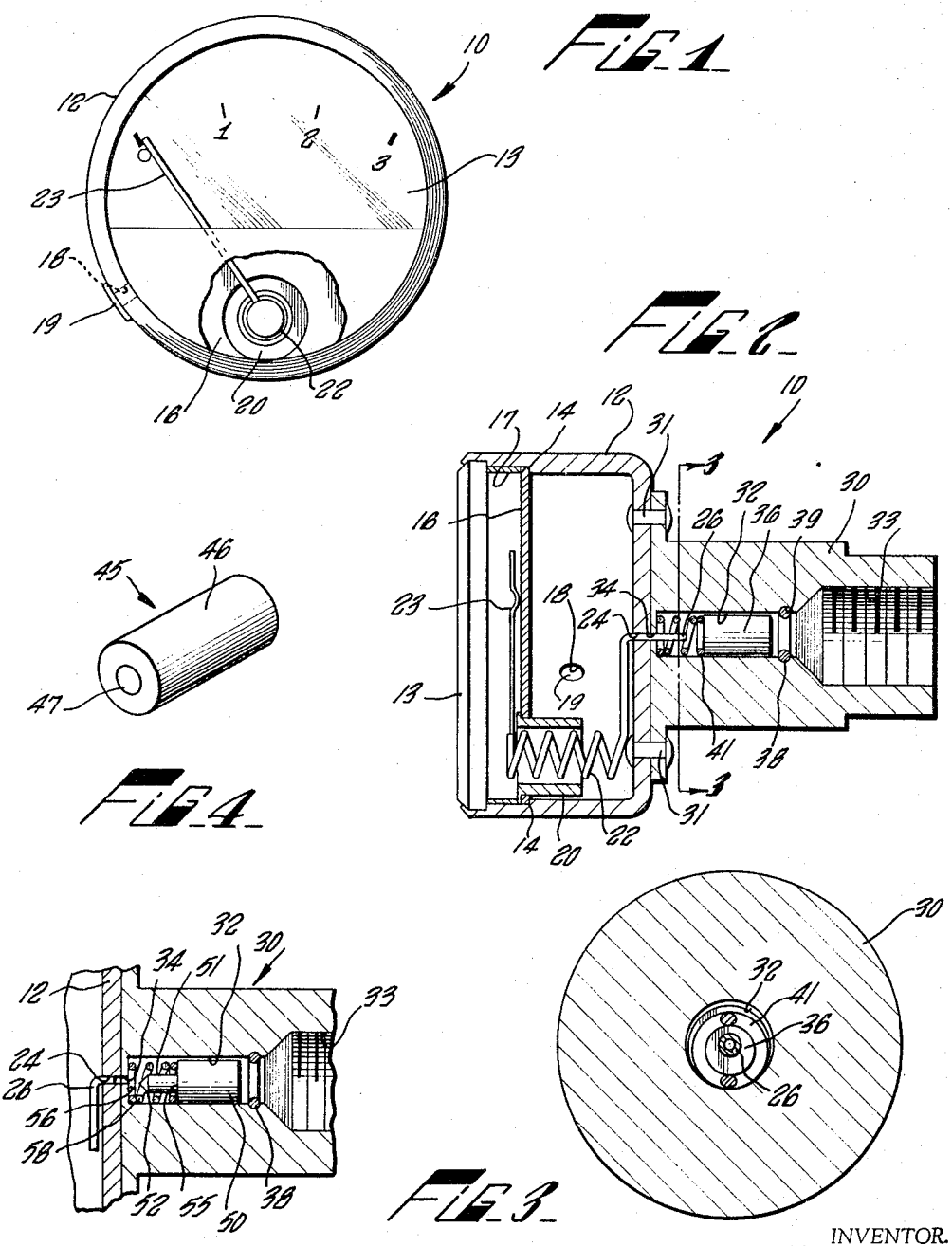
INVENTOR.
HARRY F. SMITH
GEORGE BALES
BY
Christie, Parker & Hale
ATTORNEYS United States Patent Office 3,367,187
Patented Feb. 6, 1968

3,367,187
FAILSAFE BOURDON TUBE PRESSURE GAGE
Harry F. Smith, Glendora, Calif., and George Bales, Baldwin, N.Y., assignors to QED Incorporated, Monrovia, Calif, a corporation of California
Filed Mar. 17, 1966, Ser. No. 535,140
7 Claims. (Cl. 73—418)

This application relates to a Bourdon-tube gage for measuring the pressure of a pressure medium, and specifically to apparatus for sealing the gage to avoid loss of the pressure medium in the event of rupture or other failure of the Bourdon tube.

Pressure gages having Bourdon-tube sensitive elements are well known and are widely used for measuring pressures of liquid or gaseous media. A typical application of these gages is to monitor pressure in aircraft accumulator systems used for emergency actuation of aircraft components such as landing gears, wing flaps, and the like, in the event of failure of the normal hydraulic-actuating system. Such emergency accumulator systems typically include a vessel or "bottle" filled with a gas such as nitrogen under high pressure.

The pressure gage is typically coupled to be in direct communication with the accumulator bottle, and the gage may be located on the aircraft instrument panel, or may be disposed in an inspection port accessible only during ground checking of the aircraft. The pressure gage is exposed to severe shock and vibration arising from normal operation of the aircraft, and experience has shown that this environment will occasionally cause rupture of the relatively fragile Bourdon-tube element. In conventional pressure gages, rupture or other failure of the Bourdon tube vents the accumulator bottle to the atmosphere, causing complete loss of accumulator pressure and preventing emergency actuation of the aforementioned aircraft systems. Failure of the relatively inexpensive pressure gage can thus result in damage to or loss of the entire aircraft.

The pressure gage of this invention overcomes these problems by incorporating a valve for automatically sealing the inlet of the Bourdon tube to avoid loss of the pressure medium in the event of Bourdon tube failure. The valve is an integral part of the pressure gage and is compactly constructed to be useful in miniature gages often installed in small access ports on aircraft. The valve actuates automatically upon rupture or other failure of the Bourdon tube, sealing the gage to preserve the pressure integrity of the system in which pressure is being monitored.

Briefly stated, the invention is an improvement in a pressure gage having a case and a pressure-sensitive Bourdon tube in the case, the tube having an open end extending through the case. The improvement comprises a pressure fitting having an elongated internal bore therethrough, one end of the bore defining an inlet for a pressure medium. The fitting is secured to the case whereby the open end of the Bourdon tube extends longitudinally into the bore of the fitting. A sealing plug is disposed in the bore between the tube end and the inlet, and the plug is dimensioned to be a slip fit within the bore. Means are disposed in the bore for normally holding the plug away from the tube end, whereby the Bourdon tube is normally actuated by the pressure medium. Bourdon tube rupture causes the pressure medium to force the plug against the tube end in sealing relation, avoiding loss of the pressure medium.

The invention will be described with reference to the attached drawings, in which:

FIG. 1 is a front elevation, partly broken away, of a pressure gage;
FIG. 2 is a cross-sectional side elevation of the pressure gage;
FIG. 3 is a view along lines 3—3 of FIG. 2;
FIG. 4 is a perspective view of a modified sealing plug; and
FIG. 5 is a cross-sectional side elevation of a portion of an alternative form of the pressure gage.

Referring to FIGS. 1–3, a pressure gage 10 includes a round, generally cup-shaped hollow case 12, and a transparent faceplate 13 secured across the open end of the case. The inner surface of the case is recessed adjacent the open end to form an annular shoulder 14. A graduated dial plate 16 is pressed into the case against shoulder 14 and is secured in place by an annular spacer 17 disposed between the dial plate and faceplate 13. The faceplate is secured to the case by rolling the edge of the case over the faceplate as shown in FIG. 2.

A hole 18 is formed in the side of the case, and a section of adhesive blowout tape 19 is secured to the outside of the case over the hole. The tape separates from the case in the event of Bourdon tube failure, venting the case interior to atmosphere and preventing case distortion or fracture of the faceplate.

A hollow tubular channel 20 is secured to and extends through the lower central part of the dial plate. A conventional helical Bourdon tube 22 extends through the channel, and a needle or pointer 23 is secured to a closed end of the Bourdon tube to extend in front of and parallel to the dial plate. The Bourdon tube extends from the rear of channel 20 and is bent first upwardly and then rearwardly to pass through an opening 24 in the back of case 12. An open end 26 of the tube extends beyond the back of the case.

A generally cylindrical pressure fitting 30 is secured to the back of case 12 by a pair of rivets 31 or any other conventional fastening means. The fitting includes an elongated internal bore 32, and the right side (as viewed in FIG. 2) of the bore is enlarged and includes threads 33 to receive a pressure line. The left side of the bore includes a portion of decreased diameter to define a hole 34 dimensioned to fit snugly over open end 26 of the Bourdon tube extending beyond the back of the case. The tube is brazed or soldered to the fitting and the case where it passes through holes 24 and 34 to form a pressure-tight seal, and open end 26 of the tube extends longitudinally into the bore.

An elongated, cylindrical sealing plug 36 is disposed in the bore and makes a relatively loose slip fit with the bore. The sealing plug is preferably formed from a slightly resilient plastic material, such as polytetrafluoroethylene (sold under the trademark "Teflon"). To insure a free sliding fit within the bore and to provide a vapor passage or "leak" between the plug and bore, the plug preferably has a diameter at least 0.001 inch less than the diameter of the bore.

A C-ring 38 is disposed in an annular groove 39 formed in the fitting at the end of the bore away from the open end of the Bourdon tube. The inside diameter of the C-ring is selected to be slightly smaller than the diameter of the sealing plug whereby the plug is retained in the bore. A spring 41 is disposed between the left end of the bore and the sealing plug and urges the plug away from the open end of the Bourdon tube.

In operation, the pressure gage is coupled to an accumulator bottle by a line or fitting (not shown) threaded into threads 33. This installation is typically made while the accumulator bottle is depressurized. The accumulator bottle is then filled with a pressure medium such as nitrogen to a pressure which may be in the range of 1000 to 10,000 pounds per square inch.

The pressure medium passes through the "leak" between the sealing plug and the walls of the bore to enter the Bourdon tube. Pressurization of the accumulator bottle typically proceeds at a relatively slow rate, and even the small "leak" between the plug and the walls of the bore is sufficient to avoid the creation of a large differential pressure between the right and left (as viewed in FIG. 2) ends of the plug. Even though a small differential pressure may exist between the ends of the plug during the filling operation, spring 41 exerts sufficient opposing force to hold the plug away from the open end of the Bourdon tube.

When the accumulator bottle has been filled, the pressure gage operates in conventional fashion to indicate pressure of the medium in the bottle. In the event of Bourdon tube failure, the pressure medium which has filled the Bourdon tube and the bore region to the left of the sealing plug will be vented to atmosphere. A large differential pressure is thereby suddenly created between the two ends of the sealing plug, the left end of the plug seeing approximately atmospheric pressure and the right end of the plug seeing approximately full accumulator pressure.

The force resulting from this large differential pressure snaps the sealing plug against the open end of the Bourdon tube almost instantaneously. The slightly resilient plastic material of the plug conforms itself to the shape of the tube end, forming a pressure-tight seal across the tube end. The ruptured Bourdon tube is thus sealed off from the accumulator bottle, preventing loss of the pressure medium. The plug remains in the sealing position until the accumulator bottle is vented or disconnected to lower the pressure on the right side of the plug sufficiently to permit spring 41 to move the plug away from the open end of the Bourdon tube.

FIG. 4 shows a modified sealing plug 45 formed from an elongated cylinder 46 of material such as stainless steel. The left side (viewed in FIG. 4) of the plug is recessed, and a button-like seal 47 of a slightly resilient material, such as polytetrafluoroethylene, is cemented in the recess. Sealing plug 45 is positioned in internal bore 32 of the fitting in the same fashion as sealing plug 36 described above, and seal 47 closes the open end of the Bourdon tube in the event of Bourdon tube rupture.

In another form of the invention, the sealing plug is dimensioned to be a relatively snug slip fit within the bore of the fitting, and the Bourdon tube and the bore region to the left of the sealing plug are filled with a relatively viscous material such as silicone grease. Such a material will not flow through the very narrow gap between the sealing plug and the walls of the bore, and is thus retained within the pressure gage. The sealing plug acts as a piston, forcing the viscous material into the Bourdon tube in response to the force of the pressure medium acting on the right end of the plug. That is, the Bourdon tube is actuated indirectly by the pressure medium acting through the sealing plug and viscous material.

As long as the Bourdon tube operates normally, the viscous material in the bore holds the sealing plug away from the open end of the Bourdon tube. In the event of Bourdon tube failure, the viscous material flows through the ruptured tube into the pressure-gage case, allowing the sealing plug to be forced against the open end of the Bourdon tube to seal the tube and prevent loss of the pressure medium.

An alternative form of the pressure gage of this invention is shown in FIG. 5, and is generally similar to the gage illustrated in FIGS. 1–3 except for the shape of the sealing plug and the disposition of the Bourdon tube in the fitting. In this form, open end 26 of the Bourdon tube extends through hole 24 in the rear of case 12, but protrudes only part way into hole 34 in the pressure fitting. The Bourdon tube is brazed or soldered to the fitting and case as already described.

A modified sealing plug 50 is disposed within the bore, and the left end of the plug has a necked-down portion 51 having a conical end 52. An annular shoulder 55 is defined on the plug at the right end of necked-down portion 51, and a second annular shoulder 56 is defined by the left end of the bore. A helical coil spring 58 is disposed in the bore around necked-down portion 51 and between annular shoulders 55 and 56 whereby the sealing plug is urged away (to the right as viewed in FIG. 5) from hole 34 and open end 26 of the Bourdon tube.

In the event of Bourdon tube failure, the differential pressure created between the two ends of the plug overcomes the force of spring 58, driving the plug to the left toward the open end of the Bourdon tube. Conical end 52 of the plug fits snugly against annular shoulder 56, forming a pressure-tight seal preventing flow of the pressure medium through hole 34 into the Bourdon tube.

There has been described a simple, low-cost pressure gage which provides a failsafe measuring element for a high-pressure system. Although the pressure gage has been described in terms of its application in aircraft emergency accumulator systems, it is to be understood that the gage has utility in any other application where loss of the pressure medium is to be avoided in the event of Bourdon tube failure. The pressure gage is also useful with liquid pressure media in the same fashion as discussed above.

We claim:

1. In a pressure gage having a case and a pressure-sensitive Bourdon tube in the case, the tube having an open end extending through the case, the improvement comprising a pressure fitting having an elongated internal bore, one end of the bore being an inlet for a pressure medium, the fitting being secured to the case whereby the tube end extends longitudinally into the bore; a sealing plug disposed in the bore between the tube end and the inlet and dimensioned to be a slip fit within the bore; and means in the bore for normally holding the plug away from the tube end, whereby the Bourdon tube is normally actuated by the pressure medium, and whereby Bourdon-tube rupture causes the pressure medium to force the plug against the tube end in sealing relation to avoid loss of the pressure medium.

2. The pressure-gage improvement defined in claim 1, and further comprising means disposed in the inlet end of the bore for retaining the sealing plug in the bore.

3. The pressure-gage improvement defined in claim 2, in which the means for normally holding the plug away from the tube end is a spring disposed in the bore and urging the plug away from the tube end.

4. The pressure-gage improvement defined in claim 2, in which the means for normally holding the plug away from the bore is a viscous material which fills the Bourdon tube and a region of the bore sealed by the plug and into which the open end of the Bourdon tube extends.

5. The pressure-gage improvement defined in claim 2, in which the sealing plug is formed of polytetrafluoroethylene.

6. The pressure-gage improvement defined in claim 2, in which the sealing plug comprises an elongated metal cylinder having a recess in one end, and a resilient button secured in the recess.

7. In a pressure gage having a case and a pressure-sensitive Bourdon tube in the case, the tube having an open end to receive a pressure medium, the improvement comprising a pressure fitting having an elongated internal bore, a first end of the bore being an inlet for the pressure medium, the fitting being secured to the case and the tube whereby the tube end is in communication with a second end of the bore; a sealing plug disposed in the bore between the first and second ends and dimensioned to be a slip fit within the bore; and means in the bore for normally holding the plug away from the second end, whereby the Bourdon tube is normally exposed to and actuated by the pressure medium, and whereby Bourdon-tube rupture causes the pressure medium to force the plug against the second end in sealing relation to avoid loss of the pressure medium.

References Cited

UNITED STATES PATENTS

| | | | |
|---|---|---|---|
| 1,927,487 | 9/1933 | Chisholm | 73—392 |
| 2,164,272 | 6/1939 | Higgins et al. | 137—498 |

DAVID SCHONBERG, *Primary Examiner.*

D. E. CORR, *Assistant Examiner.*